(12) United States Patent
Mukherjee et al.

(10) Patent No.: US 12,216,740 B2
(45) Date of Patent: Feb. 4, 2025

(54) DATA SOURCE EVALUATION PLATFORM FOR IMPROVED GENERATION OF SUPERVISED LEARNING MODELS

(71) Applicant: Bank of America Corporation, Charlotte, NC (US)

(72) Inventors: Maharaj Mukherjee, Poughkeepsie, NY (US); Utkarsh Raj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1065 days.

(21) Appl. No.: 17/144,345

(22) Filed: Jan. 8, 2021

(65) Prior Publication Data
US 2022/0222486 A1     Jul. 14, 2022

(51) Int. Cl.
  *G06N 20/00*     (2019.01)
  *G06F 18/214*    (2023.01)
  *G06F 18/23*     (2023.01)
  *G06V 10/75*     (2022.01)

(52) U.S. Cl.
  CPC .......... *G06F 18/23* (2023.01); *G06F 18/2155* (2023.01); *G06N 20/00* (2019.01); *G06V 10/751* (2022.01)

(58) Field of Classification Search
  CPC ..... G06F 18/23; G06F 18/2155; G06N 20/00; G06V 10/751
  See application file for complete search history.

(56) References Cited

U.S. PATENT DOCUMENTS

| | | | |
|---|---|---|---|
| 5,631,831 A | 5/1997 | Bird et al. | |
| 6,442,519 B1 | 8/2002 | Kanevsky et al. | |
| 6,728,697 B2 | 4/2004 | Leathers | |
| 7,035,914 B1 | 4/2006 | Payne et al. | |
| 7,203,346 B2 | 4/2007 | Kim et al. | |
| 7,234,156 B2 | 6/2007 | French et al. | |
| 7,292,982 B1* | 11/2007 | Hakkani-Tur | G10L 15/1822 704/10 |
| 7,464,084 B2 | 12/2008 | Huang et al. | |
| 7,634,509 B2 | 12/2009 | Onyon et al. | |

(Continued)

OTHER PUBLICATIONS

Jul. 12, 2024—U.S. Office Action—U.S. Appl. No. 17/144,366.

*Primary Examiner* — Hien L Duong
(74) *Attorney, Agent, or Firm* — Banner & Witcoff, Ltd.

(57) ABSTRACT

Aspects of the disclosure relate to evaluating sources of training data for model generation. A computing platform may receive, from one or more data sources, a labelled data set. The computing platform may apply, to the labelled data set, an unsupervised learning algorithm, resulting in a clustered data set. The computing platform may compare, for each data point in the labelled data set, corresponding clustering information and labelling information to identify discrepancies. The computing platform may flag, for data points with identified discrepancies between the clustering information and labelling information, a labelling error. The computing platform may grade, based on the flagged labelling errors, each of the one or more data sources. Using remaining data of the labelled data set, not flagged with labelling errors, the computing platform may train a supervised learning model by weighting the remaining data based on: a corresponding data source and its grade.

20 Claims, 10 Drawing Sheets

505

Grading Interface

Data from the following sources has been analyzed, and each source has received the following grade:

First Data Source: A

Second Data Source: B

Third Data Source: F

(56) References Cited

U.S. PATENT DOCUMENTS

| | | |
|---|---|---|
| 7,856,462 B2 | 12/2010 | Huang et al. |
| 8,027,521 B1 | 9/2011 | Moon et al. |
| 8,351,647 B2 | 1/2013 | Sharma et al. |
| 8,582,807 B2 | 11/2013 | Yang et al. |
| 8,732,176 B2 | 5/2014 | Chow et al. |
| 8,775,161 B1 | 7/2014 | Nichols et al. |
| 8,805,489 B1 | 8/2014 | Ofek |
| 8,886,520 B1 | 11/2014 | Nichols et al. |
| 8,892,417 B1 | 11/2014 | Nichols et al. |
| 9,047,504 B1 | 6/2015 | Ramaswamy et al. |
| 9,176,987 B1 | 11/2015 | Peng et al. |
| 9,208,147 B1 | 12/2015 | Nichols et al. |
| 9,245,008 B2 | 1/2016 | Clark et al. |
| 9,245,009 B2 | 1/2016 | Clark et al. |
| 9,424,541 B2 | 8/2016 | Koul et al. |
| 9,497,203 B2 | 11/2016 | Honig et al. |
| 9,536,517 B2 | 1/2017 | Williams et al. |
| 9,582,490 B2 | 2/2017 | Simard et al. |
| 9,652,745 B2 | 5/2017 | Taylor et al. |
| 9,665,551 B2 | 5/2017 | Zhuang et al. |
| 9,779,081 B2 | 10/2017 | Simard et al. |
| 10,055,481 B2 | 8/2018 | Ideses et al. |
| 10,157,217 B2 | 12/2018 | Gomes et al. |
| 10,157,349 B2 | 12/2018 | Caplan et al. |
| 10,162,907 B2 | 12/2018 | Glover et al. |
| 10,209,974 B1 | 2/2019 | Patton et al. |
| 10,255,803 B2 | 4/2019 | Uno |
| 10,275,690 B2 | 4/2019 | Chen et al. |
| 10,325,202 B2 | 6/2019 | Towal |
| 10,339,139 B2 | 7/2019 | Gehrke et al. |
| 10,339,464 B2 | 7/2019 | Martin et al. |
| 10,353,685 B2 | 7/2019 | Patton et al. |
| 10,354,204 B2 | 7/2019 | Chen et al. |
| 10,360,897 B2 | 7/2019 | Williams et al. |
| 10,387,468 B2 | 8/2019 | Clark et al. |
| 10,394,863 B2 | 8/2019 | Clark et al. |
| 10,397,314 B2 | 8/2019 | Arnold et al. |
| 10,430,690 B1 | 10/2019 | Chen |
| 10,482,381 B2 | 11/2019 | Nichols et al. |
| 10,521,734 B2 | 12/2019 | Chen et al. |
| 10,635,947 B2 | 4/2020 | Chen et al. |
| 10,671,942 B1 | 6/2020 | McGovern et al. |
| 10,685,329 B2 | 6/2020 | Taylor et al. |
| 10,721,057 B2 | 7/2020 | Carr |
| 10,832,174 B1 | 11/2020 | Chen et al. |
| 10,846,141 B1 | 11/2020 | Hermoni et al. |
| 10,867,215 B2 | 12/2020 | Tsai et al. |
| 10,867,253 B1 | 12/2020 | Wang et al. |
| 10,878,320 B2 | 12/2020 | Wierzynski |
| 10,909,422 B1* | 2/2021 | Gaeta ................ H04L 67/535 |
| 11,181,872 B1* | 11/2021 | Herring, III ......... G05B 13/042 |
| 11,449,788 B2* | 9/2022 | Perona .................. G06N 3/08 |
| 11,568,169 B2* | 1/2023 | Farchi ................ G06V 10/764 |
| 11,893,772 B1 | 2/2024 | Gokalp et al. |
| 2002/0046199 A1 | 4/2002 | Scarborough et al. |
| 2002/0055866 A1 | 5/2002 | Dewar |
| 2002/0122659 A1 | 9/2002 | McGrath et al. |
| 2005/0114279 A1 | 5/2005 | Scarborough et al. |
| 2007/0088601 A1 | 4/2007 | Money et al. |
| 2010/0124378 A1 | 5/2010 | Das et al. |
| 2011/0040720 A1 | 2/2011 | Zangwill |
| 2011/0299764 A1 | 12/2011 | Snoek |
| 2012/0066769 A1 | 3/2012 | Latchem et al. |
| 2012/0197816 A1 | 8/2012 | Short et al. |
| 2012/0317046 A1 | 12/2012 | Myslinski |
| 2013/0144813 A1 | 6/2013 | Sengupta et al. |
| 2013/0223694 A1 | 8/2013 | Ricanek, Jr. et al. |
| 2014/0040173 A1 | 2/2014 | Sagher et al. |
| 2014/0219526 A1 | 8/2014 | Linguraru et al. |
| 2017/0372232 A1* | 12/2017 | Maughan ............ G06F 3/0482 |
| 2019/0362027 A1* | 11/2019 | Jain ........................ G06F 30/00 |
| 2020/0134510 A1 | 4/2020 | Basel et al. |
| 2020/0219498 A1* | 7/2020 | Mukherjee ............ G10L 15/22 |
| 2020/0265341 A1 | 8/2020 | Bhatt et al. |
| 2020/0285898 A1* | 9/2020 | Dong ...................... G06N 3/08 |
| 2020/0349395 A1* | 11/2020 | Nushi ..................... G06N 3/08 |
| 2021/0174196 A1* | 6/2021 | Desmond ............ G06F 18/2321 |
| 2021/0345896 A1* | 11/2021 | Moore ................ A61B 5/6826 |
| 2021/0350283 A1* | 11/2021 | Fujita ..................... G16H 50/20 |
| 2021/0357677 A1* | 11/2021 | Hirayama ............ G06F 18/243 |
| 2021/0390455 A1* | 12/2021 | Schierz .................... G06N 5/04 |
| 2022/0012446 A1* | 1/2022 | Dolmayan ............ B65D 25/54 |
| 2022/0019730 A1* | 1/2022 | Sharma ................ G06N 20/00 |
| 2022/0036137 A1 | 2/2022 | Muselli et al. |
| 2022/0101182 A1* | 3/2022 | Patel .................... G06N 20/00 |
| 2022/0180244 A1* | 6/2022 | Ben-Itzhak ............ G06N 5/04 |
| 2022/0198287 A1* | 6/2022 | Galabov ............... G06N 5/022 |
| 2022/0207163 A1 | 6/2022 | Gentleman et al. |

\* cited by examiner

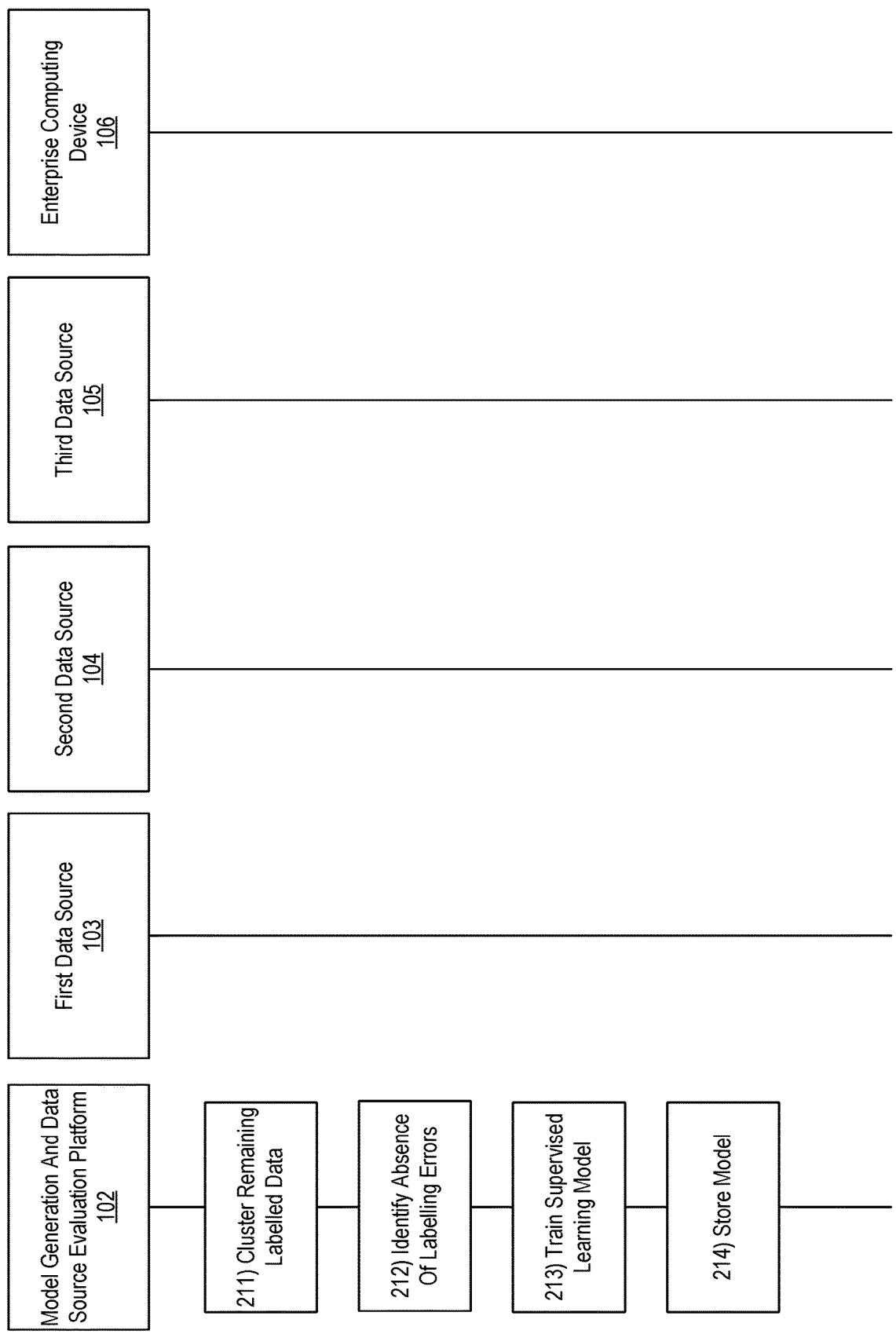

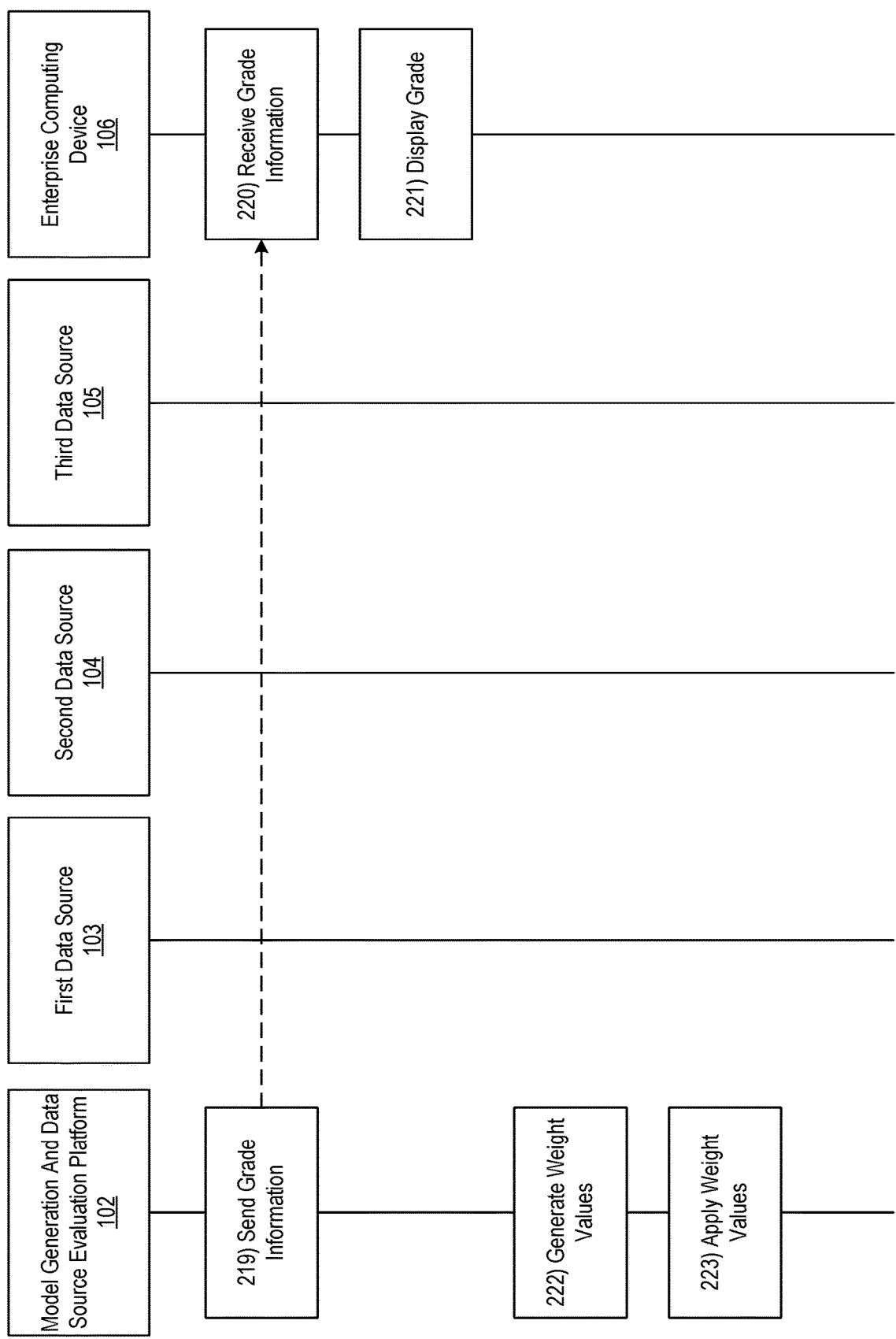

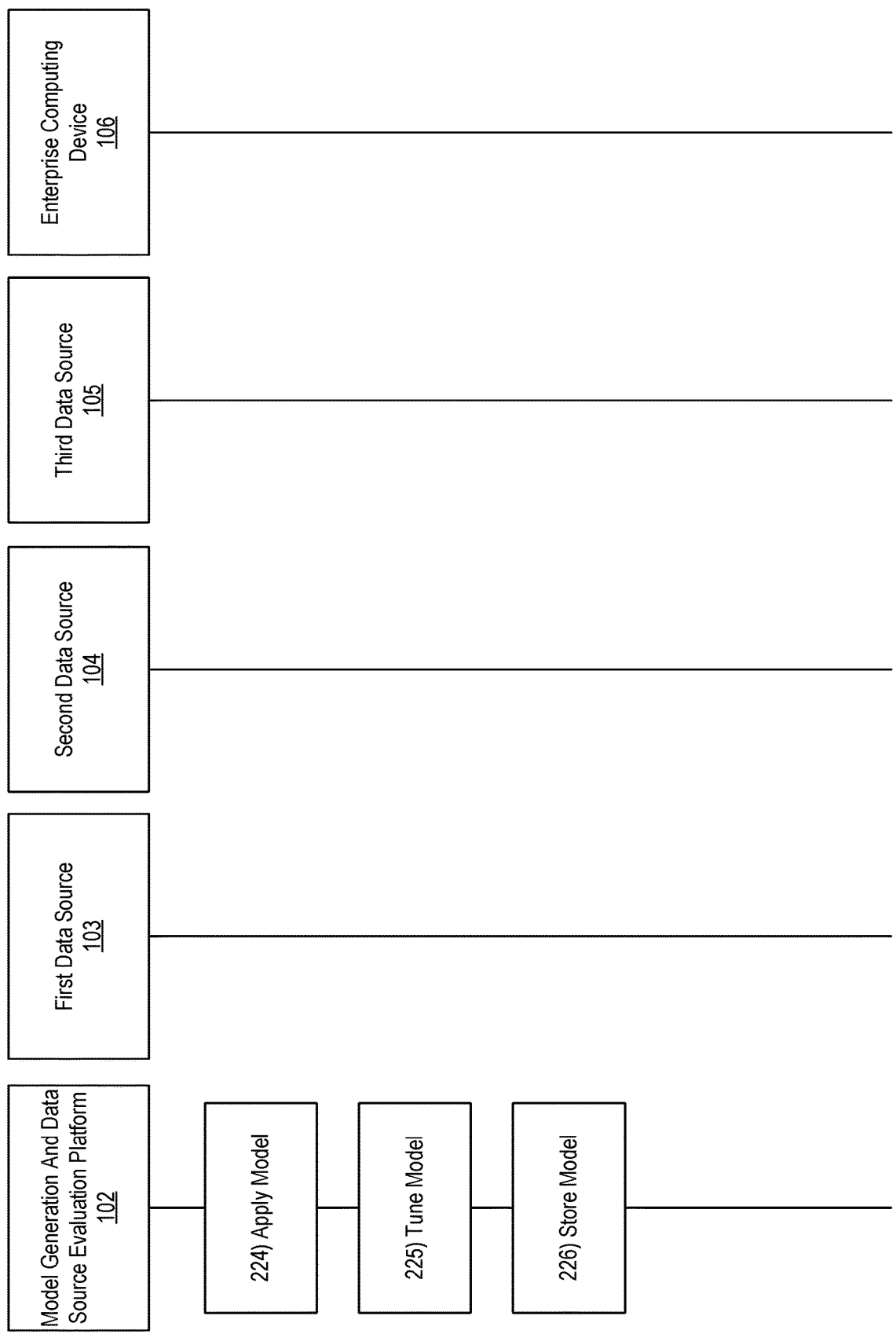

405

Error Notification

Several data points have been identified as mislabeled, and removed from the training data set.

Grading Interface

Data from the following sources has been analyzed, and each source has received the following grade:

First Data Source: A

Second Data Source: B

Third Data Source: F

DATA SOURCE EVALUATION PLATFORM FOR IMPROVED GENERATION OF SUPERVISED LEARNING MODELS

BACKGROUND

Aspects of the disclosure relate to machine learning models. In particular, one or more aspects of the disclosure relate to improving accuracy of supervised machine learning models.

In some instances, machine learning models may be implemented to make automated predictions based on a set of training data. With regard to supervised machine learning models, such models are trained using labelled data. Accordingly, labeling errors in the data used to train supervised machine learning models may reduce reliability of the supervised machine learning models, and thus may result in inaccurate outputs. Such unreliability and inaccuracy may result in operational inefficiencies in the use of supervised machine learning models.

SUMMARY

Aspects of the disclosure provide effective, efficient, scalable, and convenient technical solutions that address and overcome the technical problems associated with training supervised learning models. In accordance with one or more embodiments of the disclosure, a computing platform comprising at least one processor, a communication interface, and memory storing computer-readable instructions may receive, from one or more data sources, a labelled data set. The computing platform may apply, to the labelled data set, an unsupervised learning algorithm, which may result in a clustered data set corresponding to the labelled data set. The computing platform may compare, for each data point in the labelled data set, corresponding clustering information associated with the clustered data set and labelling information associated with the labelled data set to identify discrepancies between the corresponding clustering information and labelling information for each data point. The computing platform may flag, for data points with identified discrepancies between the corresponding clustering information and labelling information, a data labelling error. The computing platform may train, using data points without identified discrepancies between the corresponding clustering information and labelling information, a supervised learning model. The computing platform may store the trained supervised learning model.

In one or more instances, by flagging the data labelling error, the computing platform may cause the data points with the identified discrepancies between the corresponding clustering information and labelling information to be removed from the labelled data set prior to training the supervised learning model. In one or more instances, by flagging the data labelling error, the computing platform may cause the labelling information for the data points with the identified discrepancies between the corresponding clustering information and labelling information to be corrected so that the labelling information matches the clustering information.

In one or more instances, the computing platform may receive, from the one or more data sources, an unlabeled data set. The computing platform may apply, to the unlabeled data set, the unsupervised learning algorithm, which may result in a second clustered data set corresponding to the unlabeled data set. The computing platform may generate, for each data point in the unlabeled data set, polling information indicating a confidence level that corresponding clustering information associated with the second clustered data set is correct. The computing platform may compare, for each data point in the unlabeled data set, the corresponding polling information to a confidence threshold. The computing platform may flag, for data points with corresponding polling information that does not exceed the confidence threshold, a data accuracy error.

In one or more instances, the computing platform may train the supervised learning model by training the supervised learning model without the data points flagged as containing a data accuracy error. In one or more instances, the computing platform may identify, for each of the one or more data sources, a number of data labelling errors. The computing platform may compare, for each of the one or more data sources, the number of data labelling errors to an error threshold. For data sources of the one or more data sources with a corresponding number of data labelling errors that exceeds the error threshold, the computing platform may add the corresponding data source to a list of data sources from which training data should not be used.

In one or more instances, the computing platform may remove, from the labelled data set, the data points flagged with a data labeling error, resulting in a corrected data set. The computing platform may apply, to the corrected data set, the unsupervised learning algorithm, which may result in a second clustered data set corresponding to corrected data set. The computing platform may compare, for each data point in the corrected data set, corresponding clustering information associated with the clustered corrected data set and labelling information associated with the corrected data set to identify discrepancies between the corresponding clustering information associated with the clustered corrected data set and labelling information for each data point.

In one or more instances, the computing platform may compare the identified discrepancies between the corresponding clustering information associated with the clustered corrected data set and labelling information for each data point to a data labelling error threshold, and may train the supervised learning model in response to determining that the identified discrepancies between the corresponding clustering information associated with the clustered corrected data set and labelling information for each data point do not exceed the data labelling error threshold.

In one or more instances, the computing platform may generate an error notification indicating the data points flagged as containing a data labelling error, and one or more commands directing an enterprise computing device to display the error notification. The computing platform may send, to the enterprise computing device, the error notification and the one or more commands directing the enterprise computing device to display the error notification, which may cause the enterprise computing device to display the error notification.

In accordance with one or more embodiments of the disclosure, a computing platform comprising at least one processor, a communication interface, and memory storing computer-readable instructions may receive, from one or more data sources, a labelled data set. The computing platform may apply, to the labelled data set, an unsupervised learning algorithm, which may result in a clustered data set corresponding to the labelled data set. The computing platform may compare, for each data point in the labelled data set, corresponding clustering information associated with the clustered data set and labelling information associated with the labelled data set to identify discrepancies between the corresponding clustering information and labelling information for each data point. The computing platform may flag, for data points with identified discrepancies between the corresponding clustering information and labelling information, a data labelling error. The computing platform may grade, based on the flagged data labelling errors, each of the one or more data sources. The computing platform may train, using remaining data of the labelled data set, not flagged with data labelling errors, a supervised learning model, which may include training the supervised learning model by weighting the remaining data based on: a corresponding data source, of the one or more data sources corresponding to each data point of the remaining data, and the grades assigned to each of the one or more data sources.

In one or more instances, the computing platform may grade the one or more data sources by, for each data source: 1) identifying a total number of data labelling errors; 2) identifying a total number of data points; 3) computing, using the total number of data labelling errors and the total number of data points, an error percentage; and 4) assigning, based on the error percentage, a grade.

In one or more instances, the computing platform may grade the one or more data sources by, for each data source: 1) quantifying data drift for corresponding data points; and 2) assigning, based on the quantified data drift, a grade. In one or more instances, the computing platform may grade the one or more data sources by, for each data source: 1) identifying confidence levels for corresponding data points; 2) computing an aggregate confidence level for the corresponding data source based on the confidence levels for the corresponding data points; and 3) assigning, based on the aggregate confidence level, a grade.

In one or more instances, the computing platform may compare, for each data source, a corresponding grade to a grading threshold. The computing platform may determine that for at least one of the data sources, the corresponding grade does not exceed the grading threshold. Based on determining that the corresponding grade does not exceed the grading threshold for the at least one of the data sources, the computing platform may remove a portion of the labelled data set, corresponding to the at least one of the data sources, prior to training the supervised learning model.

In one or more instances, the computing platform may apply the supervised learning model, which may result in receiving additional data points. The computing platform may update the supervised learning model using the additional data points. The computing platform may store the updated supervised learning model.

In one or more instances, the computing platform may receive, from the one or more data sources, an unlabeled data set. The computing platform may apply, to the unlabeled data set, the unsupervised learning algorithm, which may result in a second clustered data set corresponding to the unlabeled data set. The computing platform may generate, for each data point in the unlabeled data set, polling information indicating a confidence level that corresponding clustering information associated with the second clustered data set is correct. In one or more instances, the computing platform may grade the one or more data sources by, for each data source corresponding to the unlabeled data set, grading the data source based on the corresponding confidence level.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for ascertaining data labeling accuracy and evaluating data sources for improved supervised learning models in accordance with one or more example embodiments;

FIGS. 4 and 5 depict illustrative graphical user interfaces for ascertaining data labeling accuracy and evaluating data sources for improved supervised learning models in accordance with one or more example embodiments.

DETAILED DESCRIPTION

Figure 1A:
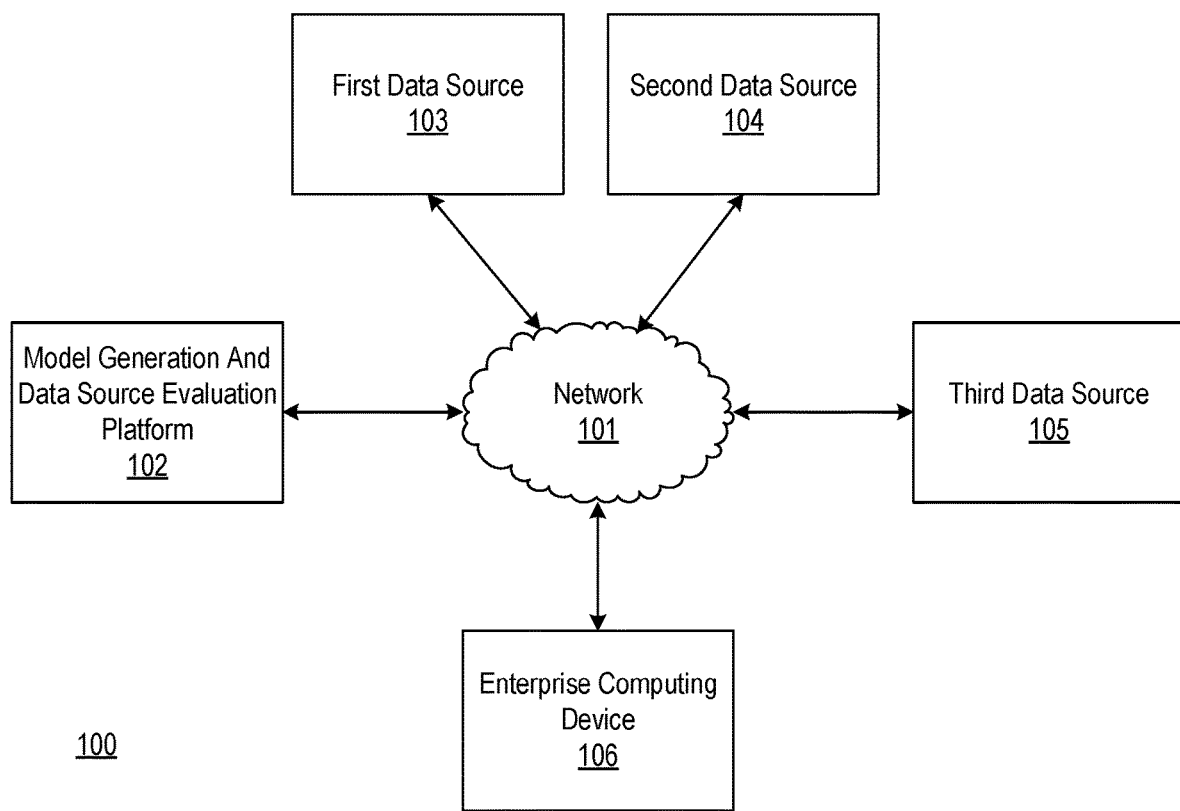
FIGS. 1A-1B depict an illustrative computing environment for ascertaining data labeling accuracy and evaluating data sources for improved supervised learning models in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe verifying data labels and grading data sources of data used to train supervised learning models so as to improve accuracy of these models. For example, in artificial intelligence and machine learning systems, the objective is to classify new datasets into categories. Two commonly used systems for this are supervised learning systems and unsupervised systems.

Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called a supervisory signal). A supervised learning algorithm analyzes the training data and produces an inferred function, which can be used for mapping new examples. An optimal scenario will allow for the algorithm to correctly determine the class labels for unseen instances. This requires the learning algorithm to generalize from the training data to unseen situations in a reasonable way.

The accuracy of the data labeling is a prerequisite for the success of supervised learning. However, there may be many reasons why data labels can be erroneous for supervised learning schema. For example, labels may be put in by mistake or sheer negligence by a human (e.g., due to fatigue or boredom). In another example, humans may experience confusion or difficulty in labeling, because some examples may be difficult to categorize by the human without any other information. As yet another example, sometimes an output may be identified as incorrectly classified after further investigation. For example, a case may be originally flagged and labelled as including prohibited behavior, but under further investigation, the case might not correspond to such behavior (e.g., due to lack of sufficient information at the time of labeling). As yet another example, sometimes an image or video may be attributed with too many tags or labels, and it may be difficult to identify which label is most appropriate. As yet another example, in some instances, humans may deliberately mislabel a data set to draw attention to the data (e.g., in social media scenarios where individuals mislabel their comments or images to draw attention). As yet another example, humans may have personal preference reflected in their choices. If these preference's stay within the data labels, the supervised learning may learn these preferences as well, and continue to maintain the preferences in future choices.

Accordingly, although human generated errors were initially the primary source of errors in machine learning, many data sets are now created with automatic labeling based on data labelled by humans. In addition to this human error, machine based labeling may have inherent problems due to software bugs and/or algorithmic errors or other software and/or hardware related problems.

Since supervised learning is dependent on accuracy of labeling the data sets, if data sets are erroneously labeled, it may be expected to generate inaccurate responses to new sets of data. Accordingly, in some jurisdictions, output of machine learning methods are checked by regulators for inherent preferences. It is therefore imperative to ensure that data sets are properly labeled, regardless of the source of the labeling (e.g., by humans or machines) in a supervised learning technology.

Unlike supervised learning methods, unsupervised learning techniques are label agnostic. This type of machine learning technique creates clusters based on similarities of features of data objects.

Unsupervised learning is a type of machine learning that looks for previously undetected patterns in a data set with no pre-existing labels and with a minimum of human supervision. In contrast to supervised learning that usually uses human-labeled data, unsupervised learning, also known as self-organization, allows for modeling of probability densities over inputs.

Since left to itself, an unsupervised learning model may create small clusters, and the maximum number of clusters is often limited. One or more aspects of the disclosure presented herein depends on the assertion that irrespective of whether a supervised learning method or unsupervised learning method is used, the goal of any machine learning method should remain the same—that is that all the similar data objects with similar features should ultimately find themselves in the same group or cluster. If by chance a data object is found in the same cluster where most other data objects are labeled differently, it may be identified that the data is wrongly labeled. That data may then either be removed, or flagged for further inspection before it is used for supervised learning.

In order to make this method more robust, three or more different types of unsupervised learning may be used before flagging data as mislabeled, and take the majority polling of the unsupervised learning to make the decision. If the majority of unsupervised learning models agree that the data might be mislabeled, it is handled accordingly.

Some common methods of unsupervised learning are: hierarchical clustering, k-means, mixture models, DBSCAN, OPTICS algorithm, and spectral clustering. Additionally or alternatively, clustering may be decided based on minimization of multiple moments of the data points from the centroid of each cluster minimization of the overall entropy for the whole set, and/or optimization of the Gini Impurity.

Accordingly, as described in greater detail below, the following steps may be performed: 1) input a set of labeled data points, 2) determine the number of clusters to be created for each unsupervised learning (this number may be the same as the number of labels in the given set of labeled data points), 3) run three or more unsupervised learning methods and divide the given points into sets of clusters (these clusters created by unsupervised learning might not use the provided labels), 4) for each output of each unsupervised learning method, inspect neighbors in the same cluster and, if the point has the same label as the majority of its neighbors, mark it as correctly labeled, otherwise mark it as mislabeled, and 5) flag each point marked as mislabeled, and 6) remove and/or otherwise inspect any flagged data before it is used for supervised learning. In some embodiments, any chosen unsupervised learning that consistently disagrees with other chosen unsupervised learning may be further tuned so as to improve agreement.

Accordingly, by creating the same number of clusters as there are numbers of labels in the labeled set of data for given data objects, checking the neighbors of each data point to find if its labels agree with its neighbors, and flagging mislabeled data points, accuracy of labels for data used to train supervised learning models may be increased, which may result in a more robust supervised learning model. Furthermore, accuracy of these methods may be increased by applying multiple types of unsupervised learning, and the method may be agnostic to error sources (e.g., whether the error is originally caused by humans or created by automated machines).

With regard to an additional embodiment, in some instances, the data labels described above may be provided by many different sources, which may be identified as metadata. Such data sources may be graded based on their accuracy levels with respect to peer data sources.

For example, a polling method may be used to find whether a particular point belongs to a cluster or not. Then, the method may identify if any particular source consistently classifies data more than other sources. If so, the weight of that source may be increased for the next round of applying the polling method. Similarly, if any particular source consistently misclassifies the data more than other sources, and the weight of that source may be reduced for the next round of applying the polling methods.

These data level inaccuracies may be weighted based on how many peer data sources misclassify the data as described below. If a particular data level is classified accurately by less than 50% of the data sources, that data set may be deemed too confusing and no weightage may be attributed for misclassification. Rather, data labels for weightage may be considered only for those that are accurately classified by at least 75% of the sources.

Other data that has been deemed less confusing is weighted according to the percentage of peer data sources that correctly labelled the data. For example, if 95% of the sources correctly labelled the data, then misclassification of that particular data set may be weighted as 95% and the sources that misclassify the particular data may be deemphasized accordingly.

In doing so, a data vs. data source matrix may be generated and a weight value may be summed up for each data source. Finally, each source may be assigned a weight value that is a weighted average of the individual weight value of each data-source.

This estimated score may then be used for deciding how much weightage should be assigned to a particular source while using that source for a supervised learning paradigm. Typically, the more error prone a source is deemed, the less weightage the source may be assigned in supervised learning. In doing so, accuracy of supervised learning models may be further increased by grading data sources, weighting data from such graded data sources based on their corresponding reliability, and training the supervised learning models using this weighted data.

Figure 1B:
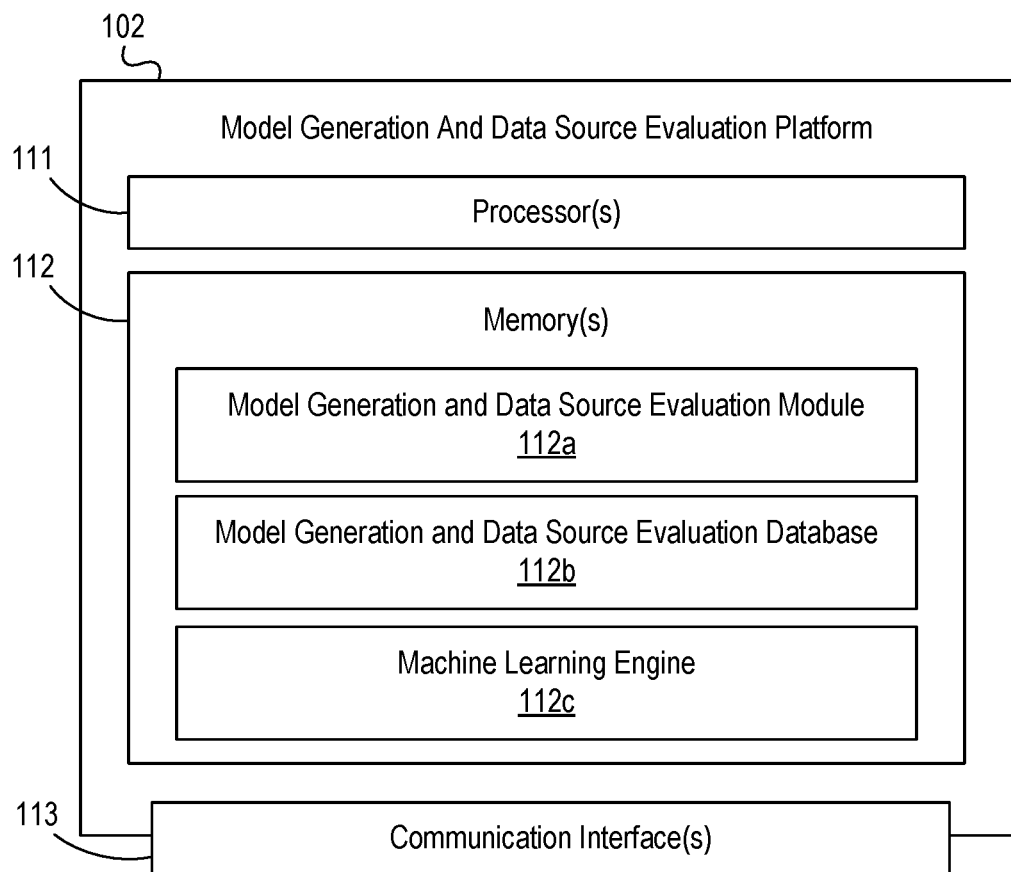

FIGS. 1A-1B depict an illustrative computing environment for ascertaining data labeling accuracy and evaluating data sources for improved supervised learning models in accordance with one or more example embodiments. Referring to FIG. 1A, computing environment 100 may include one or more computer systems. For example, computing environment 100 may include model generation and data source evaluation platform 102, first data source 103, second data source 104, third data source 105, and enterprise computing device 106.

As described further below, model generation and data source evaluation platform 102 may be a computer system that includes one or more computing devices (e.g., servers, server blades, or the like) and/or other computer components (e.g., processors, memories, communication interfaces) that may be used to identify data labelling errors and/or evaluate data sources for data used to train a supervised learning model.

First data source 103 may include one or more computing devices (e.g., servers, server blades, or the like) and/or other computer components (e.g., processors, memories, communication interfaces) that may be used to store data (e.g., labelled or unlabeled data) that may be used to train a machine learning model. In some instances, the first data source 103 may be configured to communicate with the model generation and data source evaluation platform 102 for the purpose of sending the training data.

Second data source 104 may include one or more computing devices (e.g., servers, server blades, or the like) and/or other computer components (e.g., processors, memories, communication interfaces) that may be used to store data (e.g., labelled or unlabeled data) that may be used to train a machine learning model. In some instances, the second data source 104 may be configured to communicate with the model generation and data source evaluation platform 102 for the purpose of sending the training data.

Third data source 105 may include one or more computing devices (e.g., servers, server blades, or the like) and/or other computer components (e.g., processors, memories, communication interfaces) that may be used to store data (e.g., labelled or unlabeled data) that may be used to train a machine learning model. In some instances, the third data source 105 may be configured to communicate with the model generation and data source evaluation platform 102 for the purpose of sending the training data.

Enterprise computing device 106 may be a laptop computer, desktop computer, mobile device, tablet, smartphone, or the like that may be used by an employee or administrator of an enterprise organization (e.g., a financial institution, or the like). For example, the enterprise computing device 106 may be used by one or more individuals to identify data labeling errors and/or grading information for data sources related to generation of a supervised learning model. In some instances, enterprise computing device 106 may be configured to display one or more user interfaces (e.g., error notifications, grading notifications, and/or other interfaces).

Computing environment 100 also may include one or more networks, which may interconnect model generation and data source evaluation platform 102, first data source 103, second data source 104, third data source 105, and/or enterprise computing device 106. For example, computing environment 100 may include a network 101 (which may interconnect, e.g., model generation and data source evaluation platform 102, first data source 103, second data source 104, third data source 105, and/or enterprise computing device 106).

In one or more arrangements, model generation and data source evaluation platform 102, first data source 103, second data source 104, third data source 105, and/or enterprise computing device 106 may be any type of computing device capable of sending and/or receiving requests and processing the requests accordingly. For example, model generation and data source evaluation platform 102, first data source 103, second data source 104, third data source 105, enterprise computing device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of model generation and data source evaluation platform 102, first data source 103, second data source 104, third data source 105, and/or enterprise computing device 106, may, in some instances, be special-purpose computing devices configured to perform specific functions.

Referring to FIG. 1B, model generation and data source evaluation platform 102 may include one or more processors 111, memory 112, and communication interface 113. A data bus may interconnect processor 111, memory 112, and communication interface 113. Communication interface 113 may be a network interface configured to support communication between model generation and data source evaluation platform 102 and one or more networks (e.g., network 101, or the like). Memory 112 may include one or more program modules having instructions that when executed by processor 111 cause model generation and data source evaluation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of model generation and data source evaluation platform 102 and/or by different computing devices that may form and/or otherwise make up model generation and data source evaluation platform 102. For example, memory 112 may have, host, store, and/or include model generation and data source evaluation module 112a, model generation and data source evaluation database 112b, and machine learning engine 112c.

Model generation and data source evaluation module 112a may have instructions that direct and/or cause model generation and data source evaluation platform 102 to execute advanced techniques to identify mislabeled data and evaluate data source. Model generation and data source evaluation database 112b may store information used by model generation and data source evaluation module 112a and/or model generation and data source evaluation platform 102 in application of advanced machine learning techniques to identify labeling errors, evaluate data sources, and/or in performing other functions. Machine learning engine 112c may have instructions that direct and/or cause the model generation and data source evaluation platform 102 to set, define, and/or iteratively refine optimization rules and/or other parameters used by the model generation and data source evaluation platform 102 and/or other systems in computing environment 100.

Figure 2A:
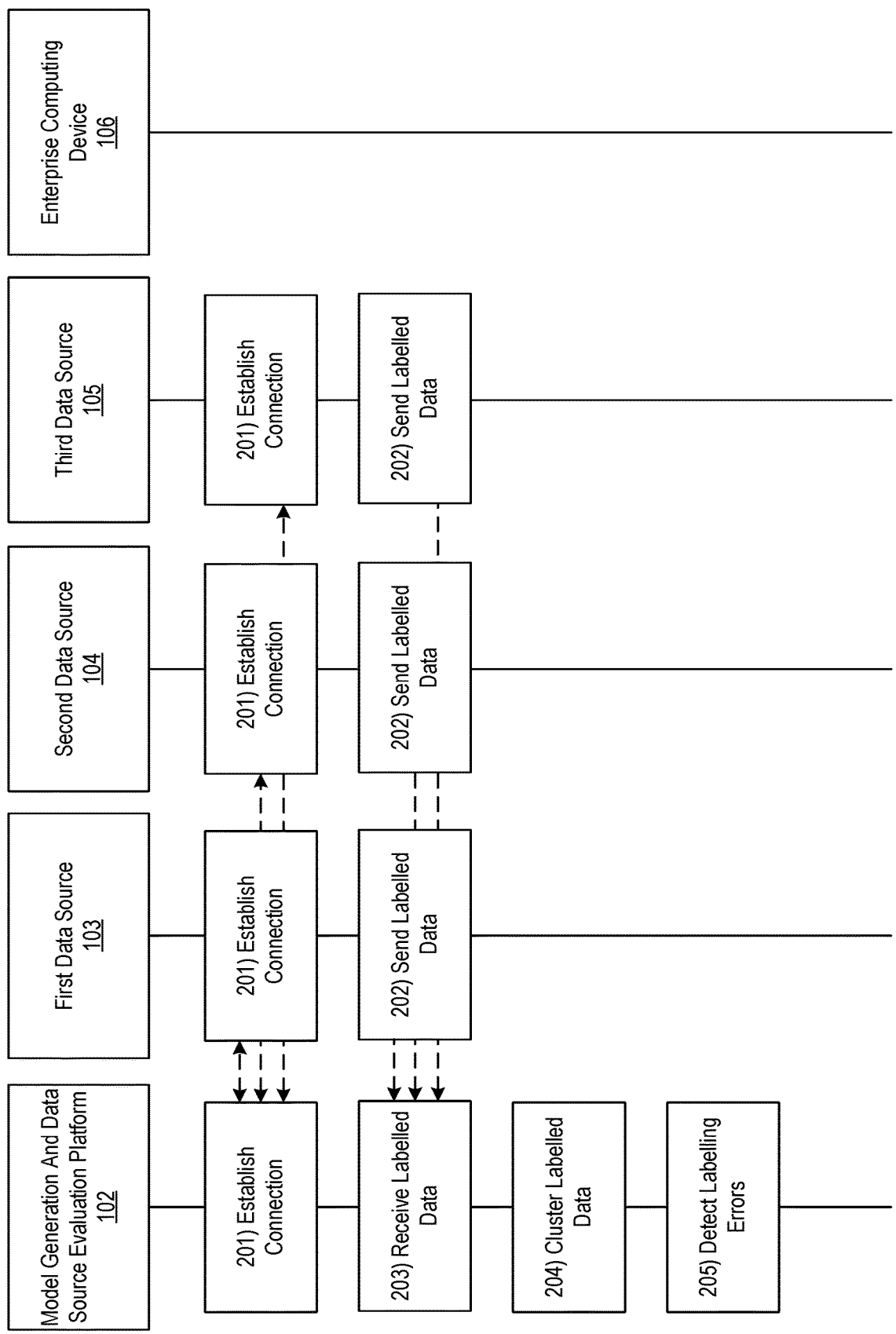

FIGS. 2A-2F depict an illustrative event sequence for ascertaining data labeling accuracy and evaluating data sources for improved supervised learning models in accordance with one or more example embodiments. Referring to FIG. 2A, at step 201, the first data source 103, second data source 104, and/or third data source 105 may establish connections with the model generation and data source evaluation platform 102. For example, the first data source 103, second data source 104, and/or third data source 105 may establish first, second, and/or third wireless data connections respectively to link the first data source 103, second data source 104, and/or third data source 105 to the model generation and data source evaluation platform 102 (e.g., in preparation for sending data). In some instances, the first data source 103, second data source 104, and/or third data source 105 may identify whether a connection is already established with the model generation and data source evaluation platform 102. If a connection is already established between the first data source 103, second data source 104, and/or third data source 105 and the model generation and data source evaluation platform 102, the first data source 103, second data source 104, and/or third data source 105 might not re-establish the corresponding connection. If a connection is not yet established between the first data source 103, second data source 104, and/or third data source 105 and the model generation and data source evaluation platform 102, the first data source 103, second data source 104, and/or third data source 105 may establish the corresponding connection accordingly.

At step 202, the first data source 103, second data source 104, and/or third data source 105 may send data to the model generation and data source evaluation platform 102. For example, the first data source 103, second data source 104, and/or third data source 105 may send data while the first, second, and/or third wireless data connections are respectively established. In some instances, the first data source 103, second data source 104, and/or third data source 105 may send labeled data and/or unlabeled data that may be used by the model generation and data source evaluation platform 102 to train a supervised learning model.

At step 203, the model generation and data source evaluation platform 102 may receive the data sent at step 202. For example, the model generation and data source evaluation platform 102 may receive the data via the communication interface 113 and while the first, second, and/or third wireless data connections are respectively established. In instances in which the received data is labelled, a portion of the data may be mislabeled (e.g., due to manual or computer error).

At step 204, the model generation and data source evaluation platform 102 may cluster the data received at step 203 using an unsupervised learning algorithm. For example, the model generation and data source evaluation platform 102 may apply an unsupervised learning method (hierarchical clustering, k-means, mixture models, DBSCAN, OPTICS algorithm, spectral clustering, and/or other unsupervised learning method) to cluster the data based on identified similarities between data features of each data point. Additionally or alternatively, the model generation and data source evaluation platform 102 may cluster the data through minimization of multiple moments of the data points from a centroid of each cluster, minimization of the overall entropy for the whole data set, optimization of Gini Impurity, and/or using other methods.

In some instances, the model generation and data source evaluation platform 102 may obtain multiple sets of clustering results through application of multiple unsupervised learning techniques (e.g., apply hierarchical clustering first, k-means second, and mixture models third to obtain three sets of clustered data). In clustering the data, the model generation and data source evaluation platform 102 may generate clustering information, indicating for each data point, which cluster the corresponding data point has been grouped into.

At step 205, the model generation and data source evaluation platform 102 may detect labelling errors based on the clustering information. For example, the model generation and data source evaluation platform 102 may have a higher level of trust in the clustering information (e.g., generated using unsupervised learning) than in the labeling information (which may be manually input). Accordingly, the model generation and data source evaluation platform 102 may identify discrepancies between the labeling information and the clustering information, which may indicate labeling errors.

As an illustrative example, the model generation and data source evaluation platform 102 may cluster data, based on data properties and similarities, into groups of "blue" data, "red" data, and "yellow" data. In some instances, in clustering the data, the model generation and data source evaluation platform 102 may cluster labelled data, without using the labels to cluster the data (e.g., using unsupervised learning). In some instances, once the data is clustered, the model generation and data source evaluation platform 102 may compare the data labels to the clustering results (e.g., is a point labeled "blue" clustered with the "yellow" data). By detecting these discrepancies, the model generation and data source evaluation platform 102 may identify labelling errors.

In some instances, in detecting the data labelling errors, the model generation and data source evaluation platform 102 may compare the clustering results from each of a plurality of machine learning algorithms to the labelling information. In these instances, the model generation and data source evaluation platform 102 may generate polling information indicating the labelling error results from each algorithm, and may compare the polling information to a quorum threshold prior to labeling a data point as mislabeled. For example, the model generation and data source evaluation platform 102 may determine whether a majority of the polling information indicates that the data point was mislabeled or is correctly labelled (or whether another quorum threshold is exceeded). In doing so, the model generation and data source evaluation platform 102 may increase accuracy corresponding to the labeling error detection. In some instances, the model generation and data source evaluation platform 102 may identify labelling discrepancies using any one or a combination of the methods described above for each data point received at step 203.

Additionally or alternatively, the model generation and data source evaluation platform 102 may identify proximity information, based on the clustering results, indicating a proximity of a clustered data point to the center of a particular cluster. Based on this proximity information, the model generation and data source evaluation platform 102 may identify a confidence score corresponding to the labeling information (e.g., the model generation and data source evaluation platform 102 may be more confident that a data point labelled "blue" in the center of the "blue" cluster is correctly labelled than a data point labelled "blue" that is an outlier of the "blue" cluster). By using these confidence scores to identify labelling errors, the model generation and data source evaluation platform 102 may be able to identify labelling errors and/or other errors even where no labeling information is provided to the model generation and data source evaluation platform 102.

Figure 2B:
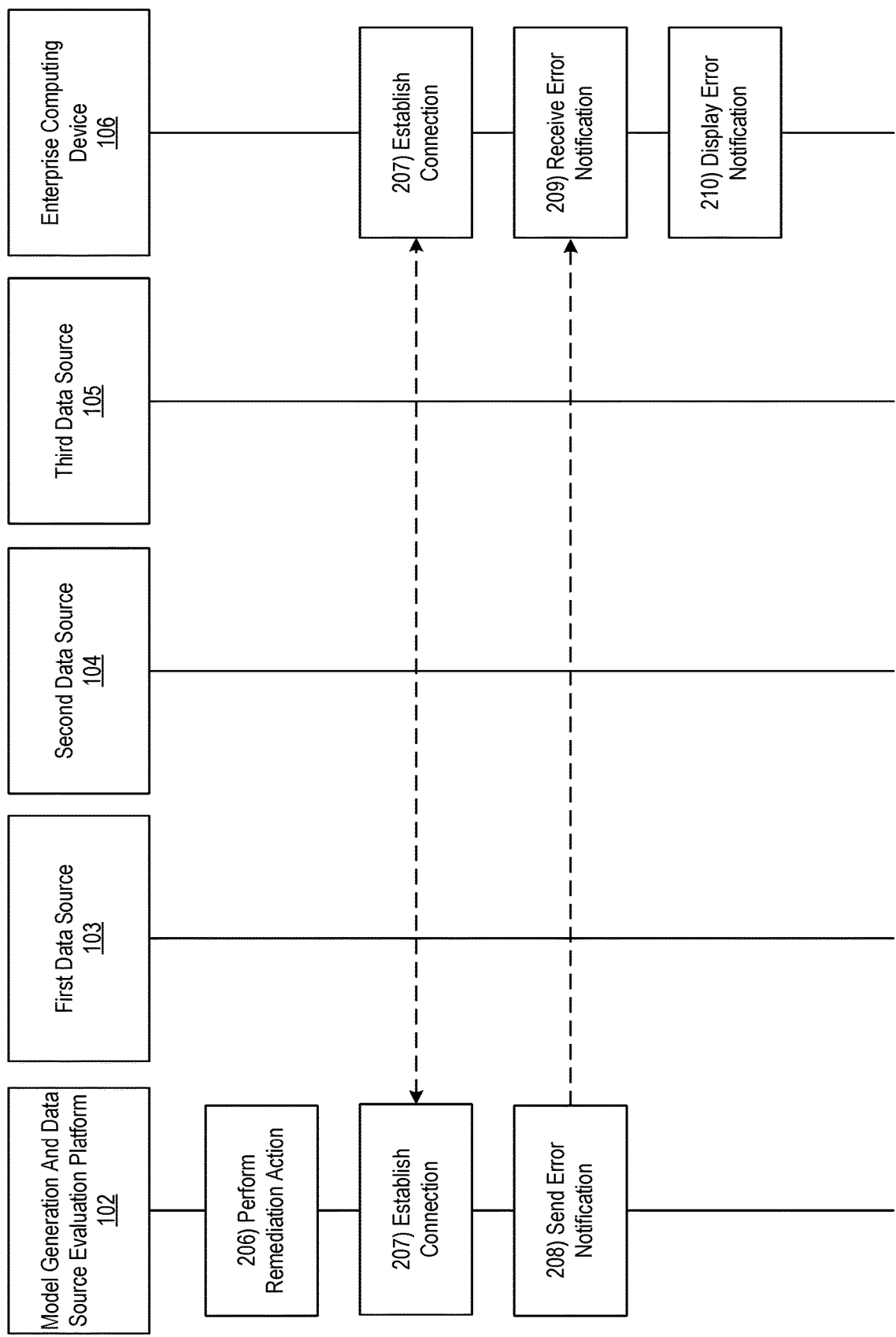

Referring to FIG. 2B, at step 206, based on or in response to flagging data as mislabeled (e.g., the identified discrepancies) the model generation and data source evaluation platform 102 may perform one or more remediation actions on any data identified as mislabeled at step 205. For example, in some instances, the model generation and data source evaluation platform 102 may remove or otherwise the mislabeled data so that it is not used in training a supervised learning model. Additionally or alternatively, the model generation and data source evaluation platform 102 may correct the mislabeled data (e.g., the model generation and data source evaluation platform 102 may relabel the data based on the clustering information). Additionally or alternatively, the model generation and data source evaluation platform 102 may flag the mislabeled data for further review. In some instances, the model generation and data source evaluation platform 102 may identify a number of data labelling errors corresponding to each of the first data source 103, the second data source 104, and the third data source 105, and may compare the number to an error threshold.

In these instances, if the model generation and data source evaluation platform 102 identifies that the number of labelling errors for a particular data source exceeds the error threshold, the model generation and data source evaluation platform 102 may add the corresponding data source to a list of data sources from which training data should not be used, or otherwise disregard the corresponding data source. If the model generation and data source evaluation platform 102 identifies that the number of labelling errors for a particular data source does not exceed the error threshold, the model generation and data source evaluation platform 102 may continue to accept training data from the corresponding data source.

At step 207, the model generation and data source evaluation platform 102 may establish a connection with the enterprise computing device 106. For example, the model generation and data source evaluation platform 102 may establish a fourth wireless data connection with the enterprise computing device 106 to link the model generation and data source evaluation platform 102 to the enterprise computing device 106 (e.g., in preparation for sending an error notification).

At step 208, the model generation and data source evaluation platform 102 may send an error notification (indicating any mislabeled data identified at step 205) to the enterprise computing device 106. For example, the model generation and data source evaluation platform 102 may send the error notification to the enterprise computing device 106 via the communication interface 113 and while the fourth wireless data connection is established. In some instances, the model generation and data source evaluation platform 102 may send, along with the error notification, one or more commands directing the enterprise computing device 106 to display the error notification.

At step 209, the enterprise computing device 106 may receive the error notification sent at step 208. For example, the enterprise computing device 106 may receive the error notification while the fourth wireless data connection is established. In some instances, in addition to receiving the error notification, the enterprise computing device 106 may receive the one or more commands directing the enterprise computing device 106 to display the error notification.

At step 210, based on or in response to the one or more commands directing the enterprise computing device 106 to display the error notification, the enterprise computing device 106 may display the error notification. For example, the enterprise computing device 106 may display a graphical user interface similar to graphical user interface 405, which is shown in FIG. 4, which may indicate that several data points have been identified as mislabeled, and have been removed from the training data set.

Referring to FIG. 2C, at step 211, the model generation and data source evaluation platform 102 may cluster remaining data (e.g., that was not removed at step 206 due to data mislabeling). For example, the model generation and data source evaluation platform 102 may perform actions similar to those described above at step 204 with regard to the data received at step 203. In doing so, the model generation and data source evaluation platform 102 may generate updated clustering information.

At step 212, the model generation and data source evaluation platform 102 may identify an absence of labelling errors in the clustered remaining data. For example, the model generation and data source evaluation platform 102 might not identify discrepancies between labels of the clustered remaining data and the updated clustering information (e.g., indicating that all data is now properly labeled). In some instances, rather than identifying an absence of labelling errors, the model generation and data source evaluation platform 102 may identify that a percentage of mislabeled data points is below a predetermined threshold (e.g., less than 1% or another percentage of the data points are mislabeled). In these instances, if the model generation and data source evaluation platform 102 determines that the threshold is not exceeded, the model generation and data source evaluation platform 102 may proceed to step 213. Otherwise, if the model generation and data source evaluation platform 102 determines that the threshold is exceeded, the model generation and data source evaluation platform 102 may return to step 206. In some instances, in detecting the presence or absence of labelling errors at step 212, the model generation and data source evaluation platform 102 may apply similar methods as those described above with regard to step 205.

At step 213, the model generation and data source evaluation platform 102 may use the remaining data to train a supervised learning model. In doing so, the model generation and data source evaluation platform 102 may filter mislabeled data prior to training the supervised learning model, which may result in a more accurate supervised learning model (e.g., because the supervised learning model may be trained using accurately labeled data rather than mislabeled data).

At step 214, the model generation and data source evaluation platform 102 may store the supervised learning model. In doing so, the model generation and data source evaluation platform 102 may enable future application of the supervised learning model.

Figure 2D:
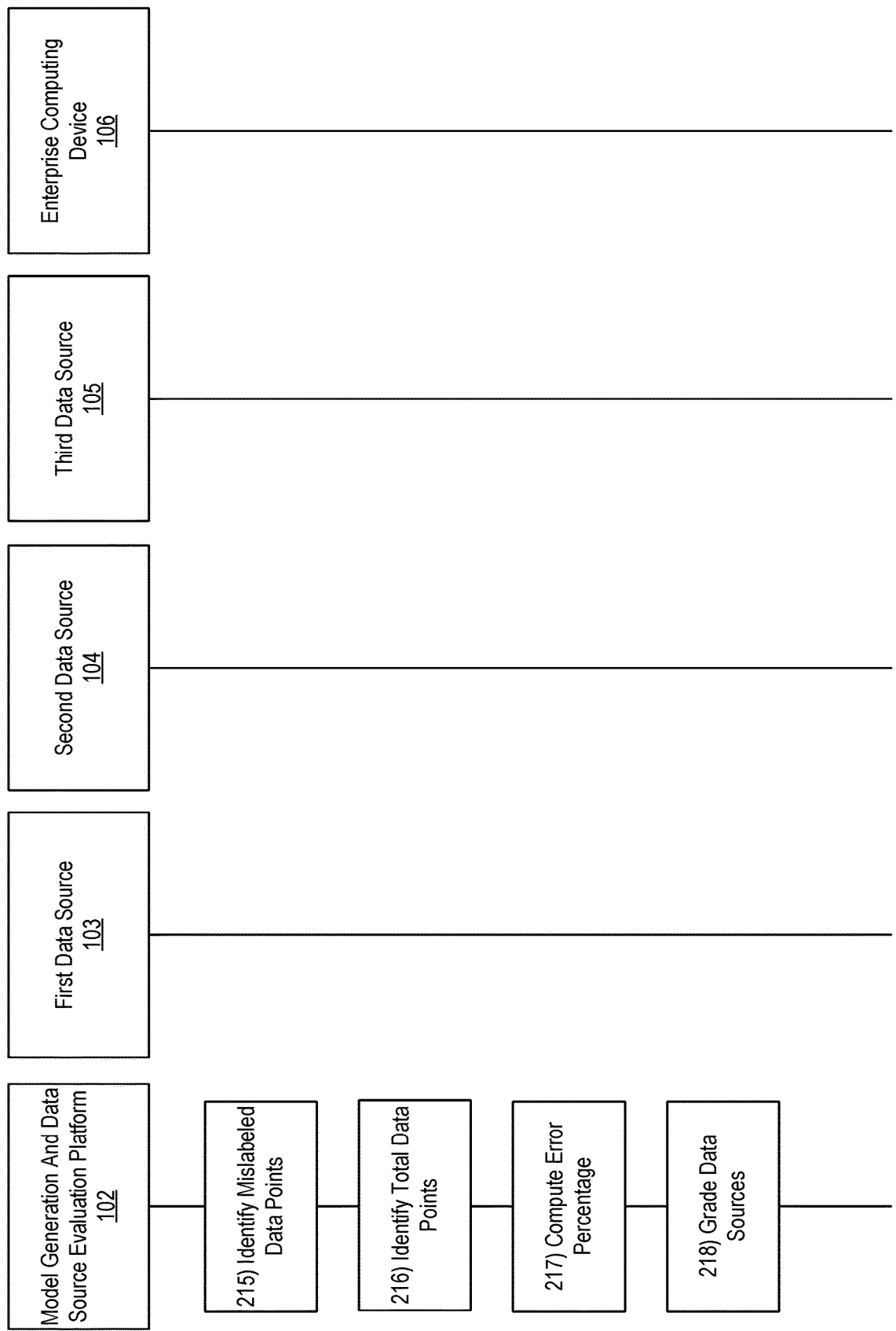

Referring to FIG. 2D, at step 215, the model generation and data source evaluation platform 102 may identify a number of data points, from each of the first data source 103, second data source 104, and third data source 105, flagged as mislabeled (e.g., at step 205). At step 216, the model generation and data source evaluation platform 102 may identify a total number of data points, from each of the first data source 103, second data source 104, and third data source 105, that were received at step 203.

At step 217, the model generation and data source evaluation platform 102 may compute a labelling error percentage for each of the first data source 103, the second data source 104, and the third data source 105. For example, the model generation and data source evaluation platform 102 may divide the number of identified mislabeled data points by the total number of data points for each data source.

At step 218, the model generation and data source evaluation platform 102 may grade the first data source 103, the second data source 104, and the third data source 105 based on the labelling error percentages computed at step 217. For example, the model generate and data source evaluation platform 102 may assign a grade of "A" to data sources with a labeling error percentage that does not exceed 1%, a grade of "B" to data sources with a labeling error percentage that exceeds 1% but does not exceed 5%, a grade of "C" to data sources with a labeling error percentage that exceeds 5%, but does not exceed 10%, and a grade of "F" to data sources with a labeling error percentage that exceeds 10%.

In addition or as an alternative to the grading the data sources using the labelling error percentages, the model generation and data source evaluation platform 102 may identify confidence levels for data points corresponding to various data points in the clustering results. For example, the model generation and data source evaluation platform 102 may identify a percentage of data points, originating from each data source, that are within a predetermined threshold distance of the center of their corresponding cluster, and a percentage of data points that are at or outside the predetermined threshold distance. In doing so, the model generation and data source evaluation platform 102 may compute an aggregate confidence level for each data source, and may assign grades to the data sources (using, for example, the percentage thresholds as described above).

Referring to FIG. 2E, at step 219, the model generation and data source evaluation platform 102 may send grade information, based on the grades assigned at step 218, to the enterprise computing device 106. For example, the model generation and data source evaluation platform 102 may send the grade information to the enterprise computing device 106 via the communication interface 113 and while the fourth wireless data connection is established. In some instances, along with the grade information, the model generation and data source evaluation platform 102 may send one or more commands directing the enterprise computing device 106 to display a grade interface.

At step 220, the enterprise computing device 106 may receive the grade information. For example, the enterprise computing device 106 may receive the grade information while the fourth wireless data connection is established. In some instances, the enterprise computing device 106 may receive the one or more commands directing the enterprise computing device 106 to display the grade interface.

At step 221, based on or in response to the one or more commands directing the enterprise computing device 106 to display the grade interface, the enterprise computing device 106 may display the grade interface based on the grade information. For example, the enterprise computing device 106 may display a graphical user interface similar to graphical user interface 505, which is shown in FIG. 5, which may show letter grades assigned to each data source.

At step 222, the model generation and data source evaluation platform 102 may generate data source weighting values based on the grade information. For example, the model generation and data source evaluation platform 102 may apply a weight value of 1 to data sources assigned an "A," a weight value of 0.8 to data sources assigned a "B," a weight value of 0.5 to data sources assigned a "C," and a weight value of 0 to data sources assigned an "F."

At step 223, the model generation and data source evaluation platform 102 may apply the data source weighting values in training a supervised learning model. For example, assuming the first data source 103 received a grade of "A," the second data source 104 received a grade of "C," and the third data source 105 received a grade of "F," the model generation and data source evaluation platform 102 may weight data from the first data source 103 twice as much as data from the second data source 104, and may ignore data from the third data source. In doing so, the model generation and data source evaluation platform 102 may weight data sources based on a level of confidence that the model generation and data source evaluation platform 102 has in each data source to provide accurately labelled data, and may thus increase overall accuracy of the supervised learning model once trained. In some instances, steps 215-223 may be performed prior to training the supervised learning model at step 213.

Referring to FIG. 2F, at step 224, the model generation and data source evaluation platform 102 may apply the supervised learning model. For example, the model generation and data source evaluation platform 102 may receive additional data, feed the additional data into the supervised learning model, and use the supervised learning model to output information about the additional data (e.g., label a color corresponding to the data points, or perform another task). In some instances, in applying the supervised learning model, the model generation and data source evaluation platform 102 may apply the data source weighting values generated at step 222.

At step 225, the model generation and data source evaluation platform 102 may tune the supervised learning model based on the additional data received. For example, data labelling accuracy of a particular data source may increase, and the model generation and data source evaluation platform 102 may modify the data source weighting values to reflect this development. Similarly, in some instances, the data labelling accuracy of a particular data source may decrease, and the model generation and data source evaluation platform 102 may modify the data source weighting values to reflect this development. Additionally or alternatively, the model generation and data source evaluation platform 102 may identify data drift in the stored datasets (e.g., stored data may become less accurate as time increases). In these instances, the model generation and data source evaluation platform 102 may quantify the data drift, and may tune the supervised learning model (and/or re-assign grades to various data sources) based on the quantified data drift. At step 226, the model generation and data source evaluation platform 102 may store the tuned supervised learning model, thus configuring the supervised learning model for future use by the model generation and data source evaluation platform 102.

Although three data sources and a single enterprise computing device are described, any number of data sources and enterprise computing devices may be implemented using one or more of the methods described herein without departing from the scope of the disclosure.

Figure 3:
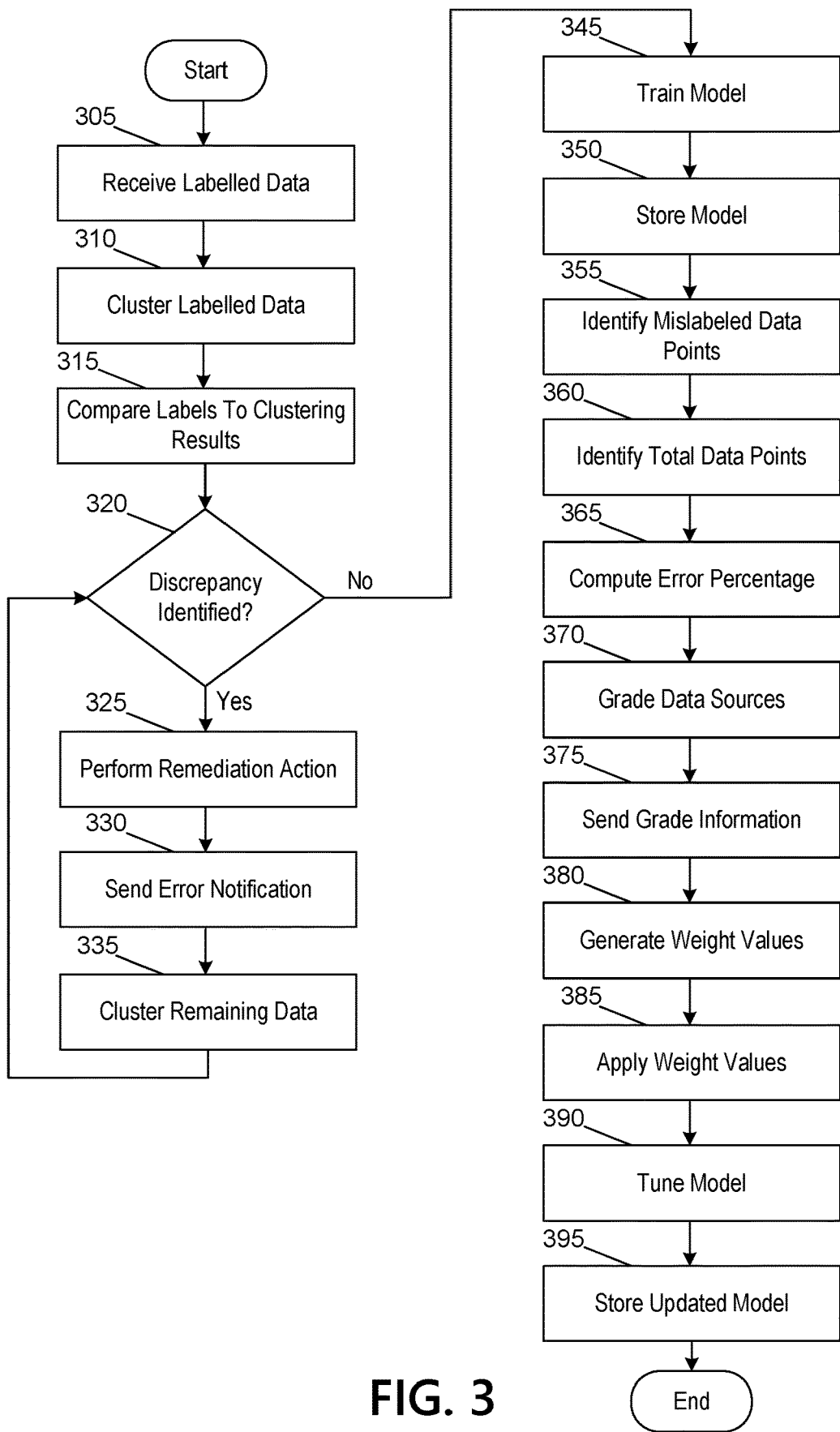
FIG. 3 depicts an illustrative method for ascertaining data labeling accuracy and evaluating data sources for improved supervised learning models in accordance with one or more example embodiments.

FIG. 3 depicts an illustrative method for ascertaining data labeling accuracy and evaluating data sources for improved supervised learning models in accordance with one or more example embodiments. Referring to FIG. 3, at step 305, a computing platform having at least one processor, a communication interface, and memory may receive labeled data. At step 310, the computing platform may cluster the labeled data using an unsupervised learning method. At step 315, the computing platform may compare data labels (of the labeled data) to the clustering results. At step 320, the computing platform may determine whether there are discrepancies between the data labels and the clustering results. If the computing platform did identify discrepancies, the computing platform may proceed to step 325.

At step 325, the computing platform may perform one or more remediation actions. At step 330, the computing platform may send an error notification for display at an enterprise computing device that indicates the identified discrepancies. At step 335, the computing platform may cluster remaining data, and return to step 320.

Returning to step 320, if the computing platform did not identify discrepancies, the computing platform may proceed to step 345. At step 345, the computing platform may train a supervised learning model using the remaining data. At step 350, the computing platform may store the supervised learning model. At step 355, the computing platform may identify a total number of mislabeled data points, corresponding to the discrepancies, corresponding to each data source. At step 360, the computing platform may identify a total number of data points corresponding to each data source. At step 365, using the total data points and mislabeled data points, the computing platform may compute an error percentage for each data source. At step 370, the computing platform may grade each data source based on the computed error percentages. At step 375, the computing platform may send grade information to the enterprise computing device for display. At step 380, the computing platform may generate weight values for each data source based on the grades. At step 385, the computing platform may apply the weight values in application of the supervised learning model. At step 390, the computing platform may tune the supervised learning model based on results of application of the supervised learning mode. At step 395, the computing platform may store the tuned supervised learning model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from one or more data sources, a labelled data set;
   apply, to the labelled data set, an unsupervised learning algorithm, wherein applying the unsupervised learning algorithm results in a clustered data set corresponding to the labelled data set, wherein applying the unsupervised learning algorithm comprises:
   applying, as a first unsupervised learning algorithm, hierarchical clustering,
   applying, after the hierarchical clustering and as a second unsupervised learning algorithm, k-means, and
   applying, after the k-means and as a third unsupervised learning algorithm, a mixture model;

compare, for each data point in the labelled data set, corresponding clustering information associated with the clustered data set and labelling information associated with the labelled data set to identify discrepancies between the corresponding clustering information and labelling information for each data point;

flag, for data points with identified discrepancies between the corresponding clustering information and labelling information, a data labelling error;

grade, based on the flagged data labelling errors, each of the one or more data sources;

send, to a user device, the grades and one or more commands directing the user device to display the grades, wherein sending the one or more commands directing the user device to display the grades causes the user device to display the grades;

train, using remaining data of the labelled data set, not flagged with data labelling errors, a supervised learning model, wherein training the supervised learning model comprises training the supervised learning model by weighting the remaining data based on:
  a corresponding data source, of the one or more data sources corresponding to each data point of the remaining data, and
  the grades assigned to each of the one or more data sources; and store, in the memory, the trained supervised learning model.

2. The computing platform of claim 1, wherein grading the one or more data sources comprises, for each data source:
  identifying a total number of data labelling errors;
  identifying a total number of data points;
  computing, using the total number of data labelling errors and the total number of data points, an error percentage; and
  assigning, based on the error percentage, a grade.

3. The computing platform of claim 1, wherein grading the one or more data sources comprises, for each data source:
  quantifying data drift for corresponding data points; and
  assigning, based on the quantified data drift, a grade.

4. The computing platform of claim 1, wherein grading the one or more data sources comprises, for each data source:
  identifying confidence levels for corresponding data points;
  computing an aggregate confidence level for the corresponding data source based on the confidence levels for the corresponding data points; and
  assigning, based on the aggregate confidence level, a grade.

5. The computing platform of claim 1, wherein the memory stores additional computer-readable instructions that, when executed by the at least one processor, cause the computing platform to:
  compare, for each data source, a corresponding grade to a grading threshold;
  determine that for at least one of the data sources, the corresponding grade does not exceed the grading threshold; and
  based on determining that the corresponding grade does not exceed the grading threshold for the at least one of the data sources, remove a portion of the labelled data set, corresponding to the at least one of the data sources, prior to training the supervised learning model.

6. The computing platform of claim 1, wherein the memory stores additional computer-readable instructions that, when executed by the at least one processor, cause the computing platform to:
  apply the supervised learning model, wherein applying the supervised learning model comprises receiving additional data points;
  update the supervised learning model using the additional data points; and
  store the updated supervised learning model.

7. The computing platform of claim 1, wherein the memory stores additional computer-readable instructions that, when executed by the at least one processor, cause the computing platform to:
  receive, from the one or more data sources, an unlabeled data set;
  apply, to the unlabeled data set, the unsupervised learning algorithm, wherein applying the unsupervised learning algorithm results in a second clustered data set corresponding to the unlabeled data set; and
  generate, for each data point in the unlabeled data set, polling information indicating a confidence level that corresponding clustering information associated with the second clustered data set is correct.

8. The computing platform of claim 7, wherein grading the one or more data sources comprises, for each data source corresponding to the unlabeled data set, grade the data source based on the corresponding confidence level.

9. A method comprising:
  at a computing platform comprising at least one processor, a communication interface, and memory:
    receiving, by the at least one processor and from one or more data sources, a labelled data set;
    applying, by the at least one processor and to the labelled data set, an unsupervised learning algorithm, wherein applying the unsupervised learning algorithm results in a clustered data set corresponding to the labelled data set, wherein applying the unsupervised learning algorithm comprises:
      applying, as a first unsupervised learning algorithm, hierarchical clustering,
      applying, after the hierarchical clustering and as a second unsupervised learning algorithm, k-means, and
      applying, after the k-means and as a third unsupervised learning algorithm, a mixture model;
    comparing, by the at least one processor and for each data point in the labelled data set, corresponding clustering information associated with the clustered data set and labelling information associated with the labelled data set to identify discrepancies between the corresponding clustering information and labelling information for each data point;
    flagging, by the at least one processor and for data points with identified discrepancies between the corresponding clustering information and labelling information, a data labelling error;
    grading, by the at least one processor and based on the flagged data labelling errors, each of the one or more data sources;
    sending, to a user device, the grades and one or more commands directing the user device to display the grades, wherein sending the one or more commands directing the user device to display the grades causes the user device to display the grades;
    training, by the at least one processor and using remaining data of the labelled data set, not flagged with data labelling errors, a supervised learning model, wherein training the supervised learning model comprises training the supervised learning model by weighting the remaining data based on:
    a corresponding data source, of the one or more data sources corresponding to each data point of the remaining data, and
    the grades assigned to each of the one or more data sources; and
storing, in the memory, the trained supervised learning model.

10. The method of claim 9, wherein grading the one or more data sources comprises, for each data source:
identifying, by the at least one processor, a total number of data labelling errors;
identifying, by the at least one processor, a total number of data points;
computing, by the at least one processor and using the total number of data labelling errors and the total number of data points, an error percentage; and
assigning, by the at least one processor and based on the error percentage, a grade.

11. The method of claim 9, wherein grading the one or more data sources comprises, for each data source:
quantifying, by the at least one processor, data drift for corresponding data points; and
assigning, by the at least one processor and based on the quantified data drift, a grade.

12. The method of claim 9, wherein grading the one or more data sources comprises, for each data source:
identifying, by the at least one processor, confidence levels for corresponding data points;
computing, by the at least one processor, an aggregate confidence level for the corresponding data source based on the confidence levels for the corresponding data points; and
assigning, by the at least one processor and based on the aggregate confidence level, a grade.

13. The method of claim 9, further comprising:
comparing, by the at least one processor and for each data source, a corresponding grade to a grading threshold;
determining, by the at least one processor, that for at least one of the data sources, the corresponding grade does not exceed the grading threshold; and
based on determining that the corresponding grade does not exceed the grading threshold for the at least one of the data sources, removing, by the at least one processor, a portion of the labelled data set, corresponding to the at least one of the data sources, prior to training the supervised learning model.

14. The method of claim 9, further comprising:
applying, by the at least one processor, the supervised learning model, wherein applying the supervised learning model comprises receiving additional data points;
updating, by the at least one processor, the supervised learning model using the additional data points; and
storing, by the at least one processor, the updated supervised learning model.

15. The method of claim 9, further comprising:
receiving, by the at least one processor and from the one or more data sources, an unlabeled data set;
applying, by the at least one processor and to the unlabeled data set, the unsupervised learning algorithm, wherein applying the unsupervised learning algorithm results in a second clustered data set corresponding to the unlabeled data set; and
generating, by the at least one processor and for each data point in the unlabeled data set, polling information indicating a confidence level that corresponding clustering information associated with the second clustered data set is correct.

16. The method of claim 15, wherein grading the one or more data sources comprises, for each data source corresponding to the unlabeled data set, grading, by the at least one processor, the data source based on the corresponding confidence level.

17. One or more non-transitory computer-readable media storing instructions that, when executed by a computing platform comprising at least one processor, a communication interface, and memory, cause the computing platform to:
receive, from one or more data sources, a labelled data set;
apply, to the labelled data set, an unsupervised learning algorithm, wherein applying the unsupervised learning algorithm results in a clustered data set corresponding to the labelled data set, wherein applying the unsupervised learning algorithm comprises:
    applying, as a first unsupervised learning algorithm, hierarchical clustering,
    applying, after the hierarchical clustering and as a second unsupervised learning algorithm, k-means, and
    applying, after the k-means and as a third unsupervised learning algorithm, a mixture model;
compare, for each data point in the labelled data set, corresponding clustering information associated with the clustered data set and labelling information associated with the labelled data set to identify discrepancies between the corresponding clustering information and labelling information for each data point;
flag, for data points with identified discrepancies between the corresponding clustering information and labelling information, a data labelling error;
grade, based on the flagged data labelling errors, each of the one or more data sources;
send, to a user device, the grades and one or more commands directing the user device to display the grades, wherein sending the one or more commands directing the user device to display the grades causes the user device to display the grades;
train, using remaining data of the labelled data set, not flagged with data labelling errors, a supervised learning model, wherein training the supervised learning model comprises training the supervised learning model by weighting the remaining data based on:
    a corresponding data source, of the one or more data sources corresponding to each data point of the remaining data, and
    the grades assigned to each of the one or more data sources; and
store, in the memory, the trained supervised learning model.

18. The one or more non-transitory computer-readable media of claim 17, wherein grading the one or more data sources comprises, for each data source:
identifying a total number of data labelling errors;
identifying a total number of data points;
computing, using the total number of data labelling errors and the total number of data points, an error percentage; and
assigning, based on the error percentage, a grade.

19. The one or more non-transitory computer-readable media of claim 17, wherein grading the one or more data sources comprises, for each data source:
quantifying data drift for corresponding data points; and
assigning, based on the quantified data drift, a grade.

20. The one or more non-transitory computer-readable media of claim 17, wherein grading the one or more data sources comprises, for each data source:
identifying confidence levels for corresponding data points;
computing an aggregate confidence level for the corresponding data source based on the confidence levels for the corresponding data points; and
assigning, based on the aggregate confidence level, a grade.

* * * * *